United States Patent [19]

Conti et al.

[11] 4,290,382
[45] Sep. 22, 1981

[54] CONNECTOR RECEIVER FOR PONTOON CAUSEWAYS

[76] Inventors: Hugo Conti, 3639 Ocean Dr.; Joseph A. Drelicharz, 1300 Elder, both of Oxnard, Calif. 93030

[21] Appl. No.: 952,021

[22] Filed: Oct. 16, 1978

[51] Int. Cl.³ .............................................. B63B 35/38
[52] U.S. Cl. ...................... 114/266; 14/27; 114/252; 114/263; 114/267; 114/249; 403/318; 403/324
[58] Field of Search ............................. 14/2.6, 27, 46; 114/230, 88, 77 R, 264, 265, 266, 267, 249, 252; 9/2 R, 2 S; 403/316, 318, 319, 324

[56] References Cited

U.S. PATENT DOCUMENTS

| | | | |
|---|---|---|---|
| 2,977,612 | 4/1961 | Frost | 14/27 |
| 3,386,117 | 6/1968 | Sterner | 114/266 |
| 3,504,389 | 4/1970 | Longbottom | 14/27 |
| 3,799,100 | 3/1974 | Marriner | 114/249 |
| 3,805,721 | 4/1974 | Robishaw | 114/266 |
| 4,086,865 | 5/1978 | Statham | 114/230 |

Primary Examiner—Trygve M. Blix
Assistant Examiner—D. W. Keen

Attorney, Agent, or Firm—Richard S. Sciascia; Joseph M. St.Amand

[57] ABSTRACT

In a system for interconnecting buoyant float sections in an articulated manner, a receiver assembly for automatically engaging a connector of a type having a longitudinally inclined nose section and a pair of transverse locking grooves. The receiver assembly comprises a receiver housing with an interior channel, a U-shaped locking guillotine member and a locking assembly. The locking guillotine is slideably introduced into a transverse slot in the receiver housing; it rests on a pair of locking bars in the locking assembly with the legs of the locking guillotine extending part-way into the interior channel of the receiver assembly. As the connector is extended into the channel, the legs of the locking guillotine contact the inclined surface of the connector nose section, causing the locking guillotine to slide up within the slot until aligned with the connector locking grooves. The locking guillotine then falls, the guillotine legs sliding down within the locking grooves, to effect interengagement. To aid in initial engagement, a cable is run through the receiver assembly channel and coupled to the connector.

10 Claims, 31 Drawing Figures

CONNECTOR RECEIVER FOR PONTOON CAUSEWAYS

BACKGROUND OF THE INVENTION

The present invention relates to connect/disconnect systems for engaging buoyant float sections in an articulated manner, and more particularly to interengagement receiver assemblies for engaging connectors. In even greater particularity, the present invention relates to such receiver assemblies capable of automatically engaging a connector.

Many marine and inshore marine work and transport operations make use of standard, buoyant float sections which are suitable for connection and disconnection to form various articulated assemblies. For example, standardized units have been developed which are suitable for articulation into barges, pontoon causeways, work platforms and the like.

To facilitate efficient assembly and disassembly, much work has been expended to develop suitable means of connection between adjacent float sections. The connection must be easy to assemble and disassemble, yet offer the strength necessary to meet the stresses encountered in various applications. One such float section assembly system utilizes connectors which are engaged in mating receiver assemblies integrally mounted on the float sections. To connect two float sections together, connectors are extended in cantilever fashion from one of two float sections to be joined. The float sections are then drawn together with the connectors engaging corresponding receiver assemblies mounted on the second float section, effecting the interconnection of the two float sections. Heretofore, the engaging mechanisms employed in the receiver assemblies required some form of manual operation. This can increase difficulty and attendant hazard in rough water assembly operations. Such a rough water situation can also increase the difficulty of bringing two float sections together.

SUMMARY OF THE INVENTION

It is therefore an object of the present invention to provide a connect/disconnect receiver assembly for engaging a mated connector, thereby connecting two buoyant float sections together.

A further object of the present invention is to provide connect/disconnect receiver assembly capable of automatically engaging a mated connector.

Another object of the present invention is to provide a connect/disconnect receiver assembly capable of integral operation with a cable coupled to a corresponding mated connector to aid in interengagement.

Still another object of the present invention is to provide a connect/disconnect receiver assembly capable of being readily mounted on existing float sections.

Accordingly, to accomplish these and other objects the present invention provides, in a system for assembling buoyant float sections in an articulated manner, a receiver assembly for automatically engaging a connector having a longitudinally inclined nose section with two transverse locking grooves disposed on opposite sides of the connector nose adjacent to the inclined surface. The connector extends from a float section.

The receiver assembly comprises a receiver housing integrally mounted on a float section. The receiver housing includes an engagment aperture and inner channel conforming to the cross sectional dimensions of the nose section of the connector. A second aperture at the opposite end of the receiver housing permits access to the interior channel to allow a cable to be run through the channel and coupled to the nose section of the connector to assist the assembly operation.

The receiver assembly includes a U-shaped locking guillotine and a locking assembly. The locking guillotine slides vertically within a transverse slot in the receiver housing with the legs of the locking guillotine extending into the interior channel. The guillotine legs conform to the locking grooves in the nose section of the connector. For interengagement, the locking guillotine is positioned in the receiver housing slot with the guillotine legs extending to some intermediate point in the interior channel. The locking guillotine is held in this position being free to slide within the slot above the intermediate point, by means of locking bars in the locking assembly.

To effect interconnection, the two float sections are drawn together so that the connector engages the mating engagement aperture of the receiver housing. As the connector extends into the interior channel of the receiver housing, the connector nose section contacts the legs of the suspended locking guillotine. This causes the locking guillotine to slide up within the guillotine slot until it becomes aligned with the locking grooves in the connector nose. At this point, the locking guillotine falls, the legs of the locking guillotine sliding within the locking grooves and engaging the connector. The locking bars are then shifted to allow the locking guillotine to slide the remaining distance down the locking grooves, completing interengagement.

The novel features believed to be characteristic of the present invention are set forth in particularity in the appended claims. However, a more complete appreciation of the present invention, both as to organization and mode of operation, and many of the attendant advantages thereof will result as the same becomes better understood by reference to the following detailed description when considered in conjunction with the accompanying drawings.

DESCRIPTION OF THE PREFERRED EMBODIMENT

The following detailed description of a specific embodiment of the receiver assembly according to the present invention is with respect to the articulated assembly of pontoon causeway float sections. However, it is to be understood that the receiver assembly can be mounted on any special purpose buoyant float section and utilized in interengagement operations as hereinafter described. Referring now to the drawings, wherein like reference characters designate like or corresponding elements throughout the several views, FIGS. 2 indicates in schematic form an interengagement system for the articulation of pontoon causeway float sections utilizing the receiver assembly according to the present invention.

Two pontoon causeway sections 1 and 2 are each fitted with a receiver assembly mounted on each corner; thus, pontoon causeway section 1 includes receiver assemblies 1a–1d while pontoon section 2 includes receiver assemblies 2a–2d. The receiver assemblies according to the present invention and utilized in interengagement operations as hereinafter described. Referring now to the drawings, wherein like reference characters designate like or corresponding elements throughout the several views, FIG. 2 indicates in schematic form an interengagement system for the articulation of pontoon causeway float sections utilizing the receiver assembly according to the present invention.

Figure 2:
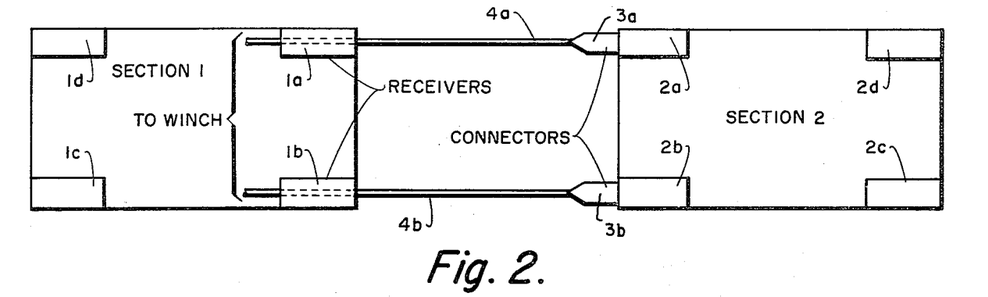
FIG. 2 is a schematic diagram illustrating an interengagement operation for two float sections utilizing the receiver assembly according to the present invention.

Two pontoon causeway sections 1 and 2 are each fitted with a receiver assembly mounted on each corner; thus, pontoon causeway section 1 includes receiver assemblies 1a–1d while pontoon causeway section 2 includes receiver assemblies 2a–2d. The receiver assemblies according to the present invention engage the connectors indicated generally at 3a and 3b, shown engaged in, respectively, receivers 2a and 2b extending from pontoon causeway section 2 in cantilever fashion. To facilitate the connection operation, especially in rough water conditions, a pair of cables 4a and 4b can be run through receivers 1a and 1b on pontoon causeway section 1 and coupled to connectors 3a and 3b. Cables 4a and 4b are then winched in, drawing pontoon causeway sections 1 and 2 together and effecting the engagement of connectors 3a and 3b within, respectively, receiver assemblies 1a and 1b to complete the interconnection of the pontoon causeways.

Figure 5A:
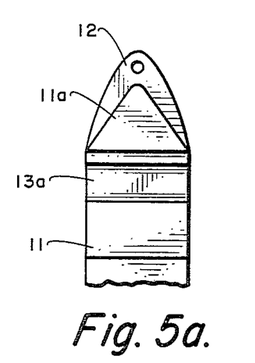
FIGS. 5a and 5b are, respectively, a side and a top view of the nose section of a connector of the type for use with the receiver assembly according to the present invention.
Figure 5B:
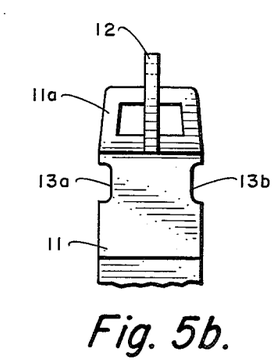

An example of the nose section of a connector for use with the receiver assembly according to the present invention is shown in FIGS. 5a and 5b, indicated generally at 11. Connector nose section 11 is of generally rectangular cross section with a tapered front, best shown in the side view of the connector head in FIG. 5a. The tapering of nose section 11 results in a longitudinally inclined surface 11a the function of which will become apparent below. Adjacent to the tapered front of nose section 11 are two vertical locking grooves 13a and 13b disposed, as is best shown in a top view in FIG. 5b, on opposite sides of connector nose 11. In addition, a cable eyelet 12 is affixed to the front of the connector nose.

Figure 1A:
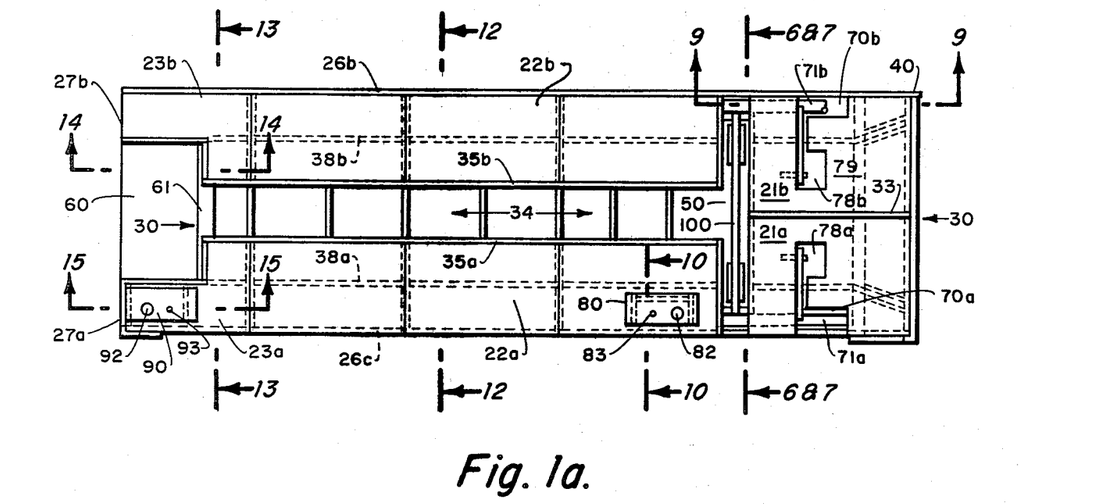
FIGS. 1a and 1b are, respectively, a top and side plan view of the receiver assembly according to the present invention.
Figure 1B:
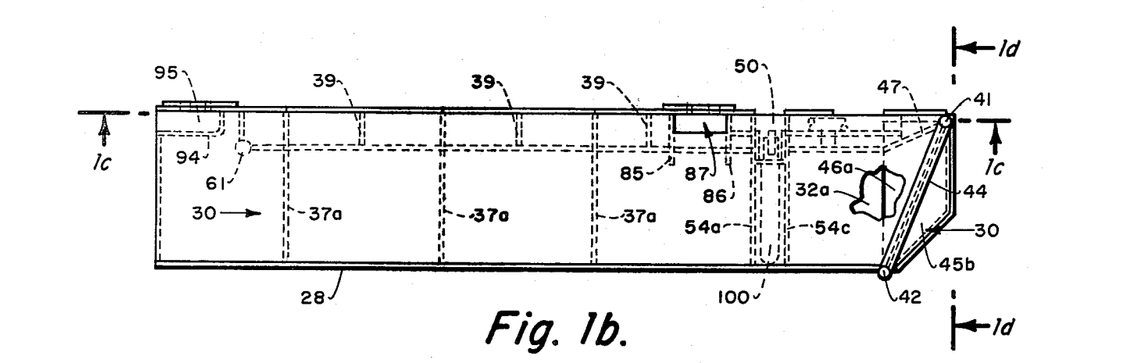
Figure 3:
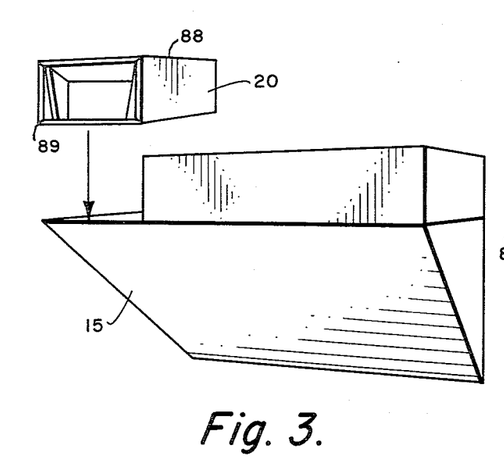
FIG. 3 is a fragmentary, schematic view of the front left corner portion of a float section which has been corner notched to provide for the mounting of a receiver assembly according to the present invention.
Figure 4:
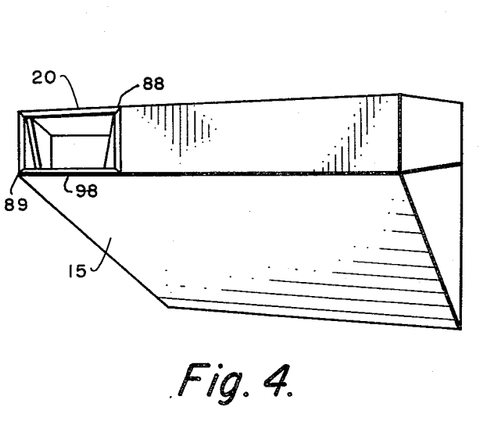
FIG. 4 is a fragmentary, schematic view of the corner portion of the float section in FIG. 3 with the receiver assembly affixed.

Referring now to the top and side plan views in, respectively, FIGS. 1a and 1b, receiver housing 20 includes an engagement aperture 40, an interior longitudinal channel 30, and an end opening 60 together with a transverse locking guillotine slot 50, a locking guillotine 100, and identical locking assemblies 70a and 70b. Receiver housing 20, as shown, is configured to be mounted (as by welding) on the left side of the portion of pontoon causeway section, as indicated schematically in FIGS. 3 and 4. A receiver housing to be mounted on the opposite side of the pontoon causeway section would be the mirror image of receiver housing 20. The only structural difference between the two receiver housings would be with respect to the necessary hardware for attaching a pontoon assembly angle to the deck surface of the receiver housing (discussed below).

The deck surface of receiver housing 20 is comprised of plates 21a and 21b, 22a and 22b, 23a and 23b. Plates 21a and 21b are welded together at the center of the deck surface of receiver housing 20, forming the deck surface anterior to guillotine slot 50. Slots 78a and 78b and 79a and 79b in, respectively, plates 21a and 21b provide access through the deck surface to locking assembly 70.

Deck plates 22a and 22b are welded to, respectively, deck plates 23a and 23b, forming the deck surface of receiver housing 20 posterior to locking guillotine slot 50. This posterior deck surface has a central, longitudinal slot 34 which permits access from the deck of the pontoon causeway section to the interior channel 30 in receiver housing 20. Deck plates 21a and 21b, 22a and 22b, and 23a and 23b are welded to respective side plates 26a and 26b which, in turn, are welded to an underside plate 28 (FIG. 1b). Finally, end plates 27a and 27b are welded to, respectively deck plates 23a and 23b and side plates 26a and 26b and to underside plate 28.

Figure 1C:
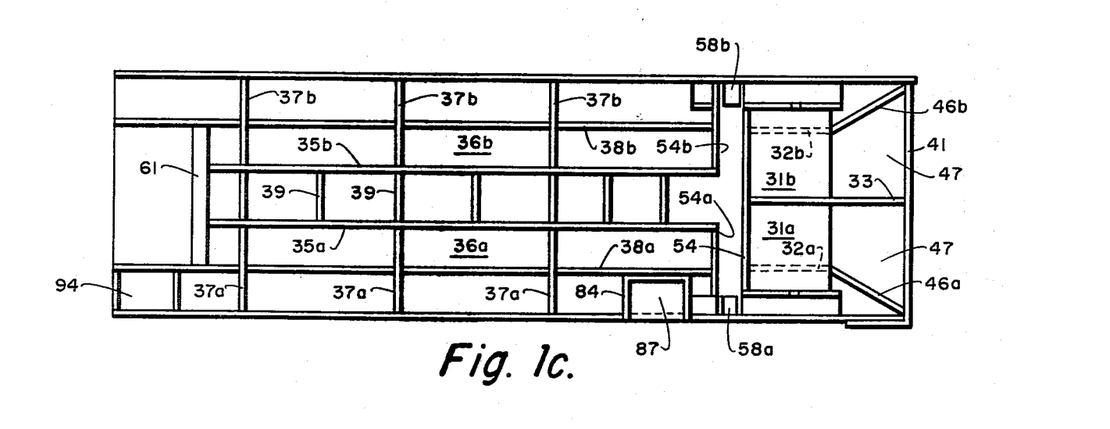
FIG. 1c, taken along line 1c—1c of FIG. 1b, is a sectional top view of the receiver housing showing the interior of the receiver housing.
Figure 1D:
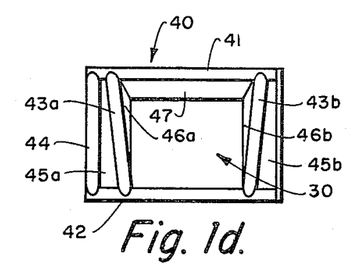
FIG. 1d, taken along line 1d—1d of FIG. 1b, is a front elevation view of the engagement aperture for the receiver housing.

Engagement aperture 40, seen best in FIG. 1d, forms the inlet to interior channel 30 and the engaging apparatus of the receiver assembly (comprised of guillotine slot 50 together with locking guillotine 100. Engagement aperture 40 includes a pair of horizontal and structural bars 41 and 42 (offset as shown in FIG. 1b) welded to connecting structural bars 43a and 43b and 44. The frontal exterior of engagement aperture 40 is formed by a plate 45a welded between structural bars 41, 42, 43a and 44, and a plate 45b (seen also in FIG. 1b) welded to structural bars 41, 43b and 42. The interior of aperture 40 is formed by plates 46a and 46b and 47 welded to, respectively, structural bars 43a, 43b and 41. As is best seen in FIGS. 1b and 1c, these interior plates form an inwardly tapering configuration this tapered inlet assists in guiding a connector into the interior channel of receiver housing 20. Together with horizontal structural bar 42, the slanting interior plates conform to the generally rectangular cross section of interior channel 30. Engagement aperture 40 is affixed to receiver housing 20 with structural bar 41 being welded to deck plates 21a and 21b and structural bars 42 and 44 and plate 45b being welded to, respectively, underside plate 28, side plate 26a and side plate 26b.

Figure 19:
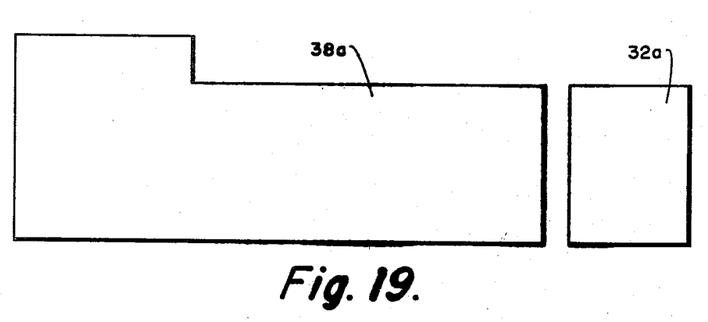
FIG. 19 is a detail elevation view showing anterior and posterior channel side plates for the receiver housing.

Considering now the interior channel 30 in receiver housing 20, and referring to FIG. 1c, anterior to guillotine slot 50 channel 30 is formed by upper surface plates 31a and 31b welded together and to aperture plate 47, and side plates 32a and 32b welded to, respectively, aperture plates 36a and 36b and to underside plate 28. (A separate detail view of side plate 32a is shown in FIG. 19.) In addition, vertical longitudinal reinforcing rib 33 is welded between the respective junctions of deck plates 21a and 21b and upper surface plates 31a and 31b for added deck surface support.

As noted above, guillotine slot 50 together with locking guillotine 100 comprises the engaging apparatus for the receiver assembly according to the present invention. The transverse guillotine slot provides a guideway within which locking guillotine 100 can be slideably introduced into the interior channel of receiver housing 20.

Figure 8A:
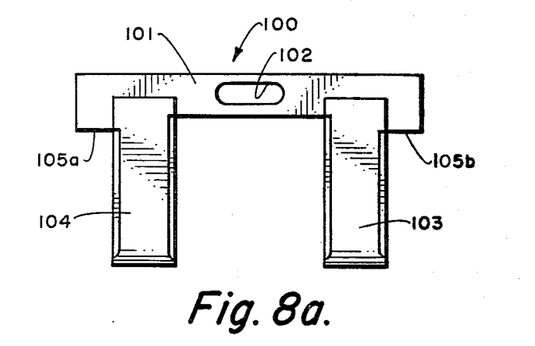
FIGS. 8a and 8b are, respectively, front and side elevation views of the locking guillotine for the receiver assembly.
Figure 8B:
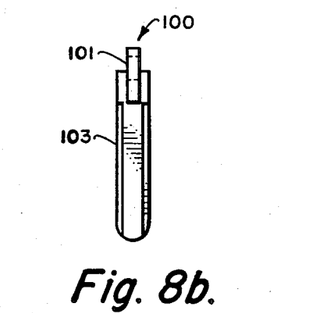

Locking guillotine 100 appears in separate detail in FIGS. 8a and 8b. The locking guillotine is of a generally U-shaped configuration formed by a horizontal spacing member 101 to which are welded two vertical legs 103 and 104. Spacing member 101 includes a central hand slot 102. Guillotine legs 103 and 104 are welded to spacing member 101 such that flange surfaces 105a and 105b remain on the ends of spacing member 101 (the function of these flange surfaces becomes apparent below). The purpose of locking guillotine member 100 is to engage the head of a connector extending into receiver housing 20. Accordingly, the inside dimension between guillotine legs 103 and 104 corresponds to the spacing between the vertical locking grooves in the connector nose section, with the inside edges of the locking guillotine legs being configured to mate with the locking grooves. This permits the guillotine legs of locking guillotine 100 to slide vertically within the connector nose locking grooves to effect engagement (and, of course, disengagement).

Figure 7:
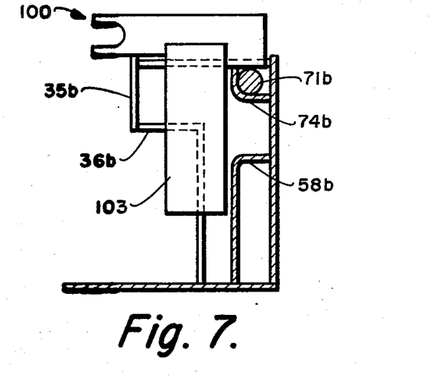
FIG. 7, taken along line 6—6 of FIG. 1a, is a fragmentary front elevation of the view as in FIG. 6 showing half of the locking guillotine disposed within the locking guillotine slot in position for automatic engagement.
Figure 17A:
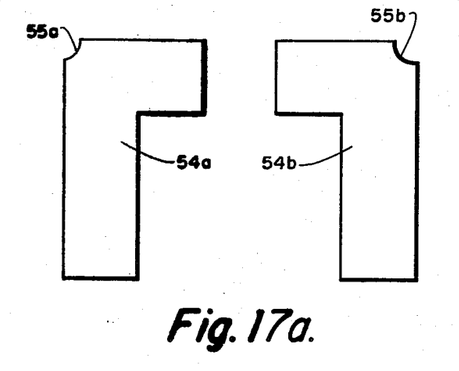
FIGS. 17a and 17b are detail elevation views of guillotine slot rib plates for the receiver housing.
Figure 17B:
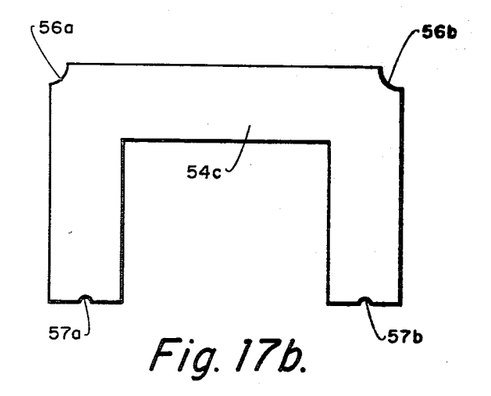

Referring to FIGS. 1a, 1b and 1c, guillotine slot 50 is formed by transverse slot ribs 54a, 54b and 54c in receiver housing 20 (see FIG. 1c). Slot ribs 54a, 54b and 54c are shown in separate detail in FIGS. 17a and 17b. The U-shaped slot rib 54c is welded to anterior deck surface plates 21a and 21b and side plates 26a and 26b. Slot rib 54a is welded to deck plate 22a and side plate 26a, while slot plate 54b is welded to deck plate 22b and side plate 26b. Note the notches 55a and 55b (FIG. 17a) in respective top corners of slot ribs 54a and 54b, and notches 56a and 56b (FIG. 17b) in slot rib 54c. As discussed below, these notches adjacent to side plates 26a and 26b accommodate locking assemblies 70a and 70b. Also, note the notches 57a and 57b in the legs of slot rib 54c; these permit water to drain from the portion of receiver housing 20 anterior to guillotine slot 50. Guillotine slot 50 also includes shoulder stops 58a and 58b, shown best in FIG. 7. The flange surfaces 105a and 105b of locking guillotine 100 rest on shoulder stops 58a and 58b when, as discussed below, the locking guillotine is fully extended within slot 50 and interior channel 30.

The interior of receiver housing 20 posterior to guillotine slot 50 includes a number of identical, transverse L-shaped ribs 37a and 37b (shown in separate detail in FIG. 16) longitudinally spaced along interior channel 30 and welded to respective side and deck plates. Interior channel 30 is formed by horizontal plates 36a and 37b and side plates 38a and 38b welded into the L-shaped notch portions of, respectively, transverse ribs 37a and 37b and slot ribs 54a and 54b. (A separate detail view of side plate 38a appears in FIG. 19.)

Figure 12:
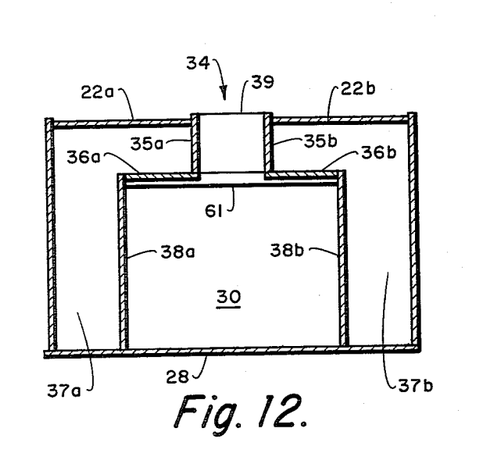
FIG. 12, taken along line 12—12 in FIG. 1a, is a front elevation view of a pair of lateral reinforcing rib plates and the longitudinal channel of the receiver assembly.

A cross sectional view of the interior of receiver housing 20 posterior to guillotine slot 50 appears in FIG. 12 showing channel ribs 37a and 37b with interior channel 30 being defined by horizontal plates 36a and 36b and side plates 38a and 38b. A longitudinal channel slot 34 (seen best in FIG. 1a) is formed by vertical longitudinal ribs 35a and 35b welded to, respectively, channel ribs 37a and 37b. Channel slot 34 also includes transverse slot ribs 39 longitudinally spaced along the channel slot and welded to channel slot plates 35a and 35b. The channel slot permits access to interior channel 30 from the deck surface of receiver housing 20.

Figure 13:
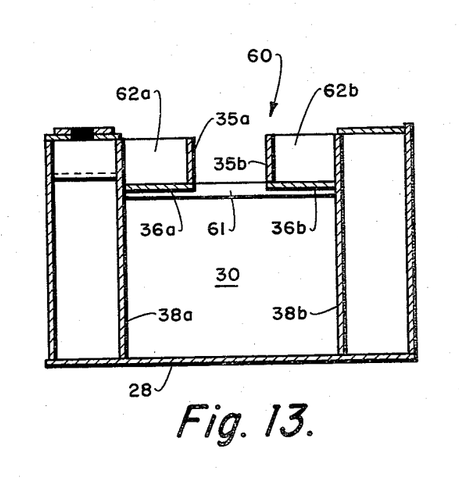
FIG. 13, taken along line 13—13 in FIG. 1a, is a front elevation view of the end aperture including the cable bar of the receiver assembly.
Figure 14:
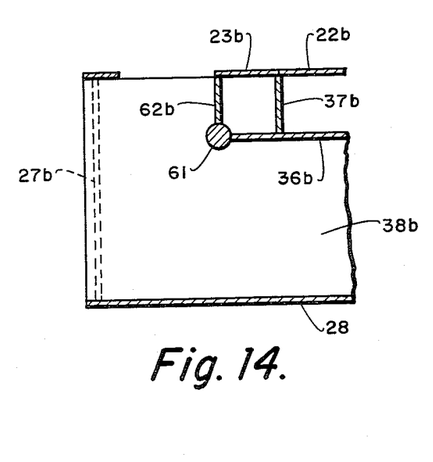
FIG. 14, taken along line 14—14 in FIG. 1a, is a side elevation view of the end opening together with the cable bar for the receiver assembly.
Figure 15:
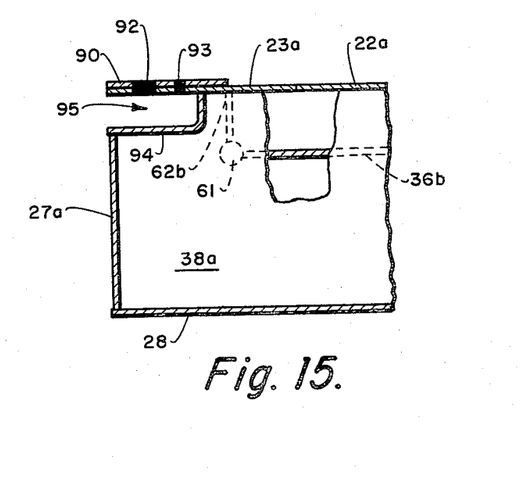
FIG. 15, taken along line 15—15 in FIG. 1a, is a side elevation view of the rear angle bar plate and bolt cavity for the receiver assembly.

Interior channel 30 terminates in the end opening 60 of receiver housing 20. As best seen in FIGS. 13 and 14, end opening 60 includes a horizontal transverse cable contact bar 61 welded between channel side plates 38a and 38b. Additionally, the ends of upper channel side plates 36a and 36b are welded to cable contact bar 61 as are two transverse end ribs 62a and 62b. As discussed below, during cable-assisted interengagement operations, a cable is run through end opening 60 and interior channel 30 and coupled to the nose section of a connector. Cable contact bar 61 provides a surface over which the cable can slide without damaging the receiver assembly.

Figure 6:
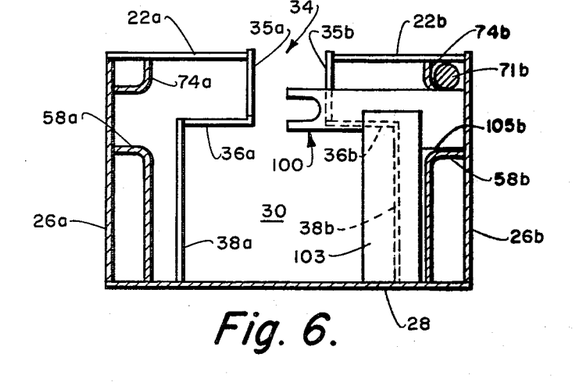
FIG. 6, taken along line 6—6 of FIG. 1a, is a front elevation view of the locking guillotine slot in the receiver housing showing only one half of the locking guillotine disposed within the slot in the fully engaged position.
Figures 9, 10:
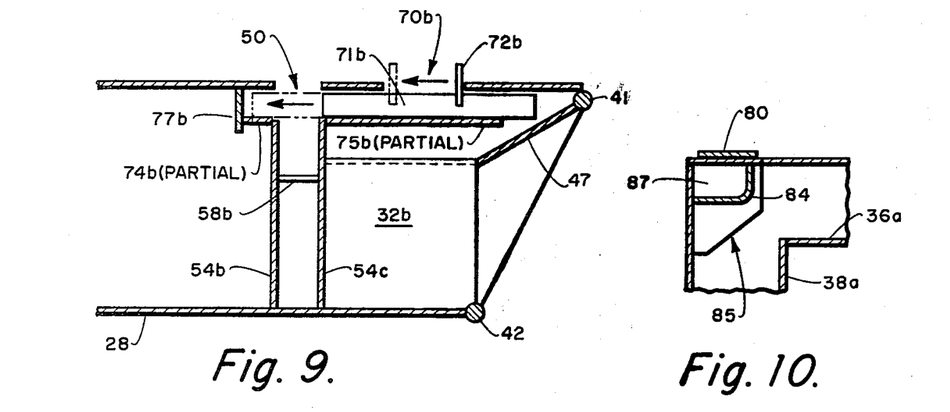
FIG. 9, taken along line 9—9 in FIG. 1a, is a side elevation view showing the locking assembly together with the locking bar of the receiver assembly.
FIG. 10, taken along line 10—10 of FIG. 1a, is a vertical front elevation view of a bolt cavity plate for the receiver assembly.
Figure 18A:
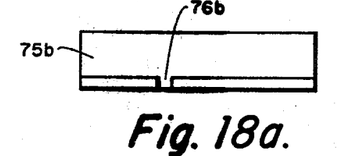
FIGS. 18a and 18b are separate detail views of an anterior locking bar guide for the locking assembly.
Figure 18B:
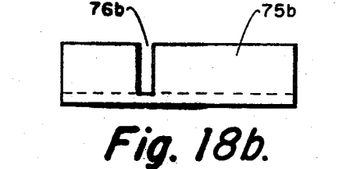

Considering the locking assemblies 70a and 70b, the two are identical so only locking assembly 70b need be discussed. As best seen in FIGS. 6 and 9, locking assembly 70b includes a longitudinal, L-shaped bar guide 75b welded anterior to guillotine slot 50 between deck plate 21b and side plate 26b, and a similarly shaped although relatively shorter bar guide 74b welded between deck plate 22b and side plate 26b posterior to the guillotine slot. Bar guides 74b and 75b fit into the notches 55b and 56b in, respectively, slot plates 54b and 54c. Separate detail views of bar guide 75b appear in FIGS. 18a and 18b. Note notch 76b, the purpose of which is explained below.

Figure 11A:
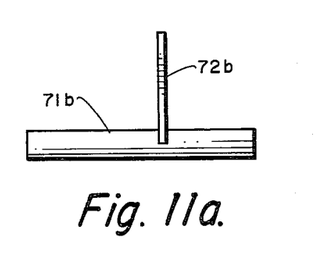
FIGS. 11a and 11b are, respectively, a side and a front elevation ivew of the locking bar for the locking assembly of the receiver assembly.
Figure 11B:
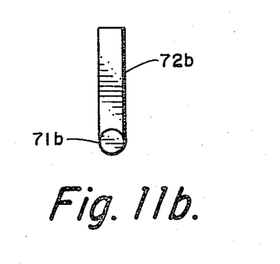

Welded to one end of bar guide 74b is a stop rib 77b. A locking bar 71b (shown in separate detail in FIGS. 11a and 11b), slides within the channel formed by bar guides 74b and 75b and has affixed perpendicularly to it a handle 72b. As explained below, locking bar 71b is disposed within the bar guide channel either in a forward position (shown in FIGS. 1a and 9) with locking bar 71b clear of guillotine slot 50, or in a rear position (indicated by the dotted lines in FIG. 9) with the locking bar extending through the guillotine slot.

Consider now, assembly angle bolting plates 80 and 90 affixed to, respectively, deck plates 22a and 23a. As noted above, receiver housing 20 is a specific embodiment of the receiver assembly according to the present invention which is to be mounted on the left side of a pontoon causeway section. Specifically, referring again to FIGS. 3 and 4, the junction 88 formed by side plate 26b and deck plates 21b, 22b, and 23b is welded to the deck surface of the pontoon causeway section; the junction 89 formed by side plate 26a and underside plate 28 is welded to the side of the pontoon causeway section; and the structural bar 42 of engaging aperture 40 is welded 98 to the front face of the pontoon causeway section. Thus, side plate 26a is integral with the side of the pontoon causeway section. Assembly angle bolt plates 80 and 90 are provided adjacent to this outside pontoon surface to permit a bolt connection to a pontoon assembly angle such as is commonly used to bolt together the pontoons which comprise the pontoon causeway section.

Considering first assembly angle plate 80, two bolts holes 82 and 83 are drilled in plate 80. As is best seen in FIG. 1a, plate 80 is welded to deck plate 22a with bolt holes 82 and 83 being aligned with corresponding holes in the surface of the deck plate. As is best seen in FIG. 10, and L-shaped bolt cavity plate 84 is welded directly below assembly angle bolt plate 80 and bolt cavity end plates 85 and 86 are welded to the ends of the bolt cavity plate defining a bolt cavity 87. Access is had to bolt cavity 87 through a corresponding slot in side plate 26a (FIG. 1b). (Note that bolt cavity end plate 86 corresponds to stop rib 77b, performing the same function in locking assembly 70a).

Figure 16:
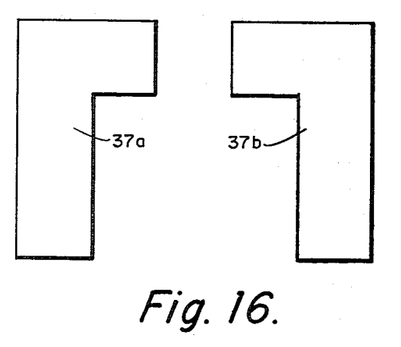
FIG. 16 is a detail elevation view of channel rib plates for the receiver housing.

Referring to FIGS. 1a and 1b, assembly angle plate 90 is welded to deck plate 23a with two bolt holes 92 and 93 aligned with two corresponding bolt holes in deck plate 23a. As best seen in FIG. 16, an L-shaped bolt cavity plate 94 is welded below plate 90. This forms a bolt cavity 95; access may be had to the bolt cavity through slots in either channel side plate 38a or receiver housing end plate 27a.

The operation of the receiver assembly according to the present invention can be described with reference to FIGS. 1a and 1b. Assume that, initially locking bars 71a and 71b are in the positions shown in FIG. 1a with the locking bars in the rear position, extending through guillotine slot 50. With respect to locking assembly 70b and locking bar 71b (locking assembly 70a being identical), handle 72b is housed below deck plate 21b within slot 78b. This arrangement is permitted by the notch 76b (see FIGS. 18a and 18b) in locking bar guide 75b. For automatic interengagement, locking guillotine 100 is placed within guillotine slot 50 with, as indicated in FIG. 8, guillotine flanges 105a and 105b contacting and resting upon, respectively, locking bars 71a and 71b. This arrangement holds the guillotine legs 103 and 104 of locking guillotine 100 at an intermediate point within interior channel 30 of receiving housing 20. In this position, locking guillotine member 100 is free to slide above locking bars 71a and 71b within slot 50.

The nose section of the connector to be engaged is drawn into the engagement aperture 40 of receiver housing 20. The funneling configuration of interior aperture plates 46a, 46b and 47 guide the connector nose into interior channel 30. As the nose section of the connector extends within channel 30, the longitudinally inclined front surface (11a in FIG. 5b) of the connector nose contacts guillotine legs 103 and 104 which, fron above, extend into the interior channel (see FIG. 7). Continued extension of the nose of the connector into interior channel 30 causes locking guillotine 100 to slide upward within guillotine slot 50 above locking bars 71a and 71b. When the legs 104 and 103 of locking guillotine 100 become aligned with the vertical locking grooves 13a and 13b, respectively, disposed in the nose section of the connector 11, locking guillotine 100 falls by gravity, the inside surfaces of leg members 103 and 104 sliding down within the locking grooves, until guillotine flanges 105a and 105b again contact, respectively, locking bars 71a and 71b. This automatic engaging procedure partially engages the nose section of the connector, locking it within receiver housing 20. This process effects the interengagement of the receiver assembly and the connector.

To complete the interconnection procedure, locking bars 71a and 71b are shifted to the forward position, clearing guillotine slot 50 and the guillotine flanges of locking guillotine 100. For locking bar 71b (the procedure for locking bar 71a is identical), an operator reaches into slot 78b in deck plate 21b and rotates handle 72b to a position perpendicular to deck plate 21b within slot 71b. Locking bar 71b can then be shifted to the forward position clearing the guillotine slot. Shifting locking bars 71a and 71b in this manner permits locking guillotine 50 to fall the remaining distance within slot 50 until guillotine flanges 105a and 105b contact shoulder stops 54a and 54b within the guillotine slot. This engages guillotine legs 103 and 104 fully within the locking grooves in the connector nose. This completes the interengagement of the receiver assembly according to the present invention with the connector. Locking bars 71a and 71b are then shifted to the forward position extending across guillotine slot 50 and over locking guillotine 100, locking it in the engaged position.

The receiver assembly according to the present invention is readily adaptable to a cable assisted interengagement operation. In the above described specific embodiment of the receiver assembly according to the present invention, a cable can be introduced into the interior channel 30 of receiver housing 20 via end opening 60. The cable is run through interior channel 30 and out engagement aperture 40, and then coupled to the nose section of the connector to be engaged. (For example, the cable can be attached to a nose section eyelet such as indicated at 12 in FIG. 5a.)

The receiver assembly according to the present invention can be manufactured using structural steel conforming to the ASTM Specification A36. For cable assisted interengagement operation, it is desirable, and recommended, that aperture structural bars 41, 42, 43a and 43b together with cable contact bar 61 be manufactured out of structural steel exhibiting a higher degree of abrasion resistance. For example, structural bars conforming to ASTM Specification A440 will provide entirely adequate abrasion resistance for cable assisted interengagement operations.

This type of connector, while described above for use with a pontoon causeway assembly, can also be readily used for attaching pontoons to ship ramps and ships, with truck trailers, guywire connectors and a variety of applications for quick connecting articulating points.

Figure 20:
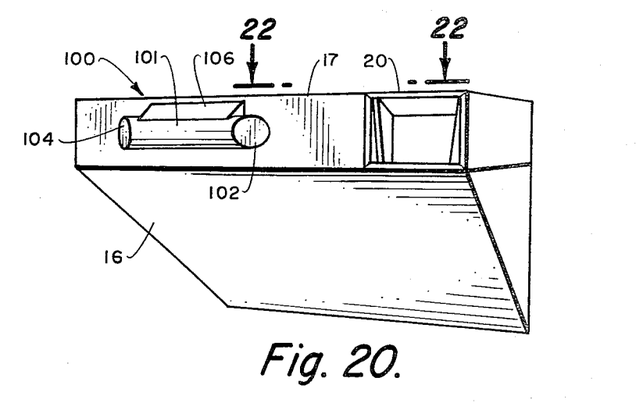
FIG. 20 is an isometric view of a portion of a pontoon causeway section together with a male pipe section.
Figure 21:
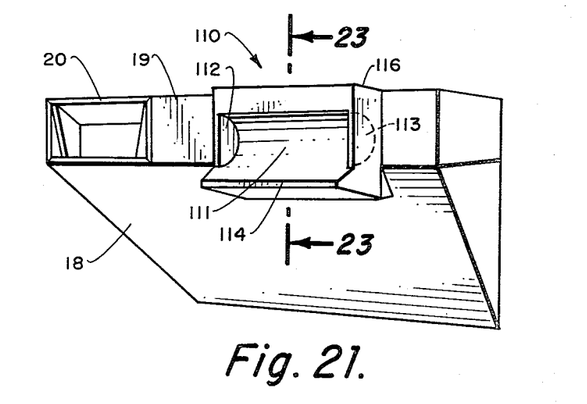
FIG. 21 is an isometric view of a portion of a pontoon causeway section together with a female pipe section.
Figure 22:
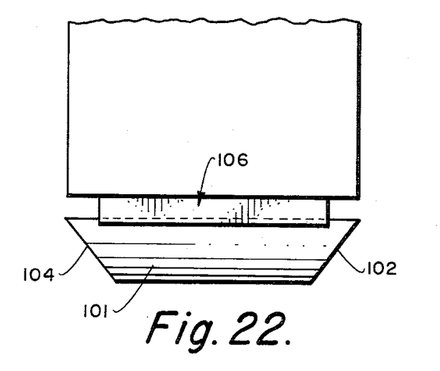
FIG. 22, taken along line 21—21 in FIG. 20 is a top view of the male pipe section.

In certain interengagement applications of the above described receiver assembly, it may be desirable to incorporate additional means for reducing the horizontal and vertical shearing loads on an engaged connector. To this end, FIGS. 20 and 21 depict a pipe-section apparatus for absorbing these shearing loads. In FIG. 20, pontoon causeway section 16 includes a receiver assembly 20 and a front face plate 17. A male pipe section 100 is affixed to face plate 16 by means of a mounting structure 106. Male pipe section 100 is fabricated from steel tubing with plates 102 and 104 welded to the ends. As best seen in FIG. 22, end plates 102 and 104 form slanting surfaces, the purpose of which wil become apparent below.

Figure 23:
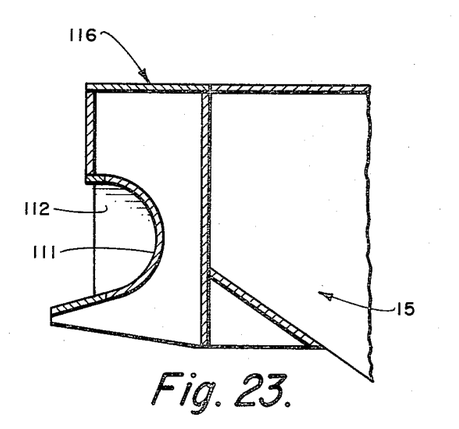
FIG. 23 taken along line 23—23 in FIG. 21, is a side view of the female pipe section.

Referring now to FIGS. 21 and 23, they show a pontoon causeway section 18 to which is affixed a female pipe section 110 which is complimentary to male pipe section 100. As best seen in FIG. 23, female pipe section 110 comprises a cylindrically shaped socket 111 slightly larger in diameter than the diameter of pipe section 101. End plates 112 and 113 (FIG. 21) are welded to the ends of the cylindrical socket 111 of pipe section 110. These end plates are disposed at a slanting angle which corresponds to slanting end plates 102 and 104 of male pipe section 101. A downwardly slanting flange 114 is welded to the lower edge of cylindrical socket 111. Female pipe section 110 is affixed to a face plate 19 on pontoon causeway section 18 by means of a mounting structure 116.

In operation, either a male or a female pipe section is affixed adjacent to each receiver assembly, with male pipe sections being disposed at one end of the pontoon causeway section and female pipe sections being disposed at the other. The pontoon causeway sections to be articulated are assembled with the male pipe sections on one pontoon causeway section being mated to the corresponding female pipe sections on the opposite pontoon causeway section. The slanting ends 102 and 104 of male pipe section 101 and the corresponding slanting ends 112 and 113 of female pipe section 110 aid in this interengagement process. When the interengagement of the receiver assemblies and corresponding connectors is completed, the male pipe sections are disposed within the cylindrical socket of the corresponding female pipe section. This permits the male and female pipe sections to absorb the horizontal and vertical shear loads while the connectors need only absorb the tension loads between interconnected pontoon causeway sections together with a small amount of compression resulting from the initial clearance between male and female pipe sections.

Obviously, other embodiments and modifications of the present invention will readily come to those of ordinary skill in the art having the benefit of the teaching presented in the foregoing description and the drawings. It is therefore to be limited thereto and that said modifications and embodiments are intended to be included within the scope of the appended claims.

What is claimed is:

1. Apparatus in buoyant float sections, for engaging a plurality thereof, comprising:
    a. a connector means having a nose section with a longitudinally inclined front surface and at least two vertical locking grooves;
    b. a pontoon section having a portion defining a channel with at least one aperture such that the nose section of said connector means can be introduced through said aperture into said channel;
    c. at least one engaging member slideably disposed within a vertical slot in communication with said channel; said engaging member having portions thereof slideable within the locking grooves in said connector means;
    d. locking means for holding said engaging member within said vertical slot such that in a first position said locking means is operable to allow said engaging member to extend to some intermediate point within said channel; said locking means permitting said engaging member to freely move vertically within said vertical slot above said intermediate point, said locking means in an open position operable to allow said engaging member to extend below said intermediate point within said channel;
    e. said connector means being extended into said channel such that the longitudinally inclined front surface of the connector means nose contacts said engaging member, causing the engaging member to slide upward within said vertical slot until said engaging member and the connector means nose locking grooves are aligned, at which time with said locking means in open position said engaging member is operable to slide by gravity into said locking grooves thereby engaging said connector within the channel of said receiver assembly;
    f. said locking means also being operable to be placed in a closed position to hold said engaging member down in said vertical slot for preventing accidental disengagement of said engaging member with said connector means locking grooves.

2. The apparatus as recited in claim 1 wherein said channel includes two apertures such that a cable can be run through said channel and coupled to said connector means to assist in the engagement of the receiver assembly with said connector.

3. The apparatus as recited in claim 2 in which the nose section of said connector means has two vertical locking grooves disposed on opposite sides of the nose section, and said engaging member comprises:
    a. a U-shaped engaging member having a pair of legs;
    b. the legs of said U-shaped engaging member being simultaneously slideable within corresponding locking grooves in the connector means nose section.

4. The apparatus as recited in claim 3 wherein:
    a. said U-shaped engaging member includes a pair of flanges one on either side of said U-shaped member; and
    b. said locking means includes a pair of locking bars movably disposed within said vertical slot such that when said U-shaped engaging member is placed in the vertical slot, said locking bars are operable to contact a respective flange thereby holding the legs of the U-shaped engaging member at an intermediate point within said channel while permitting the U-shaped engaging member to freely move vertically within the vertical slot above said intermediate point.

5. The apparatus as recited in claim 4 wherein said locking bars are movable from a first position which permits said U-shaped engaging member to freely move vertically only above said intermediate point in said channel during the interengagement of the U-shaped engaging member and the nose section of said connector means, to a second position permitting said U-shaped engaging member to slide down within the locking grooves in the connector means nose section below the intermediate point in said channel to where the legs of said U-shaped engaging member are completely engaged within said nose section locking grooves.

6. The apparatus as in claim 5 wherein said locking means is again movable to said first position from said second position after said U-shaped engaging member slides down into complete engagement with said nose section locking grooves to lock said connector means in place and being operable to prevent said U-shaped engaging member from moving upward to disengage from said locking grooves.

7. Apparatus as in claim 1 wherein opposite ends of said buoyant float sections are provided with means for reducing horizontal and vertical shearing loads on an engaged connector means.

8. Apparatus as in claim 7 wherein said means for reducing horizontal and vertical shearing loads comprises:
   a. a male unit mounted at one end of each buoyant float section and a female unit mounted at the opposite end of each buoyant float section such that when a plurality of buoyant sections are connected together the male unit on one buoyant section will mate with the female unit on another buoyant section;
   b. said male and female units being respectively tapered to correspondingly complement each other allowing interengagement upon interconnection of buoyant sections to absorb horizontal and vertical shear loads while said connector means substantially only absorb tension loads between buoyant sections.

9. For use in the combination of buoyant float sections, a receiver assembly for engaging a connector having a nose section with a longitudinally inclined front surface and two locking grooves disposed on opposite sides of the nose section, said receiver assembly comprising:
   a. a receiver housing mountable on a buoyant float section; said receiver housing having an interior longitudinal channel with at least one aperture such that the nose section of the connector can be introduced through the aperture and into said channel;
   b. an engaging member slideably disposed within a vertical slot in said receiver housing in communication with said channel; said engaging member being slideable within the locking grooves in said connector nose section;
   c. locking means for holding said engaging member within said vertical slot such that said engaging member extends to some intermediate point within said channel; said locking means permitting said engaging member to slide freely within said vertical slot above said intermediate point;
   d. said connector being extended into said channel such that the longitudinally inclined front surface of the connector nose contacts with said engaging member, causing the engaging member to slide upward within said vertical slot until said engaging member and the connector nose locking groove are aligned, said engaging member then being operable to slide by gravity into the locking groove thereby engaging said connector within the channel of said receiver assembly;
   e. said channel including two apertures such that a cable can be run through said channel and coupled to said connector to assist in the interengagement of the receiver assembly with said connector;
   f. said engaging member being U-shaped and having a pair of legs; the legs of said U-shaped engaging member being simultaneously slideable within corresponding locking grooves in the connector nose section;
   g. said U-shaped engaging member including a pair of flanges one on either side of said U-shaped members; and said locking means including a pair of locking bars which intersect with said vertical slot such that when the U-shaped engaging member is placed in the vertical slot said locking bars are operable to contact a respective flange thereby holding the legs of the U-shaped engaging member at an intermediate point within said channel while permitting the U-shaped engaging member to slide freely within the vertical slot above said intermediate point.

10. The receiver assembly as recited in claim 9 wherein said locking bars are movable from a first position, permitting said U-shaped engaging member to slide freely only above said intermediate point in said channel during the interengagement of the U-shaped engaging member and the nose section of said connector, to a second position permitting said U-shaped engaging member to slide down within the locking grooves in the connector nose section below said intermediate point in said channel to where the legs of said U-shaped engaging member completely engage said nose section locking grooves.

* * * * *